(12) United States Patent
Rangwala et al.

(10) Patent No.: US 10,288,641 B2
(45) Date of Patent: May 14, 2019

(54) SYSTEM AND METHOD OF MEASURING 2- AND 3-DIMENSIONAL VELOCITY VECTOR USING CROSS-CORRELATION VELOCIMETRY

(75) Inventors: Ali S. Rangwala, Worcester, MA (US); Scott Rockwell, Worcester, MA (US)

(73) Assignee: WORCESTER POLYTECHNIC INSTITUTE, Worcester, MA (US)

( * ) Notice: Subject to any disclaimer, the term of this patent is extended or adjusted under 35 U.S.C. 154(b) by 697 days.

(21) Appl. No.: 13/017,506

(22) Filed: Jan. 31, 2011

(65) Prior Publication Data

US 2011/0209541 A1    Sep. 1, 2011

Related U.S. Application Data

(60) Provisional application No. 61/299,850, filed on Jan. 29, 2010.

(51) Int. Cl.
*G01P 5/00* (2006.01)
*G01P 5/10* (2006.01)

(52) U.S. Cl.
CPC ............ *G01P 5/001* (2013.01); *G01P 5/10* (2013.01)

(58) Field of Classification Search
USPC .................................................... 73/240.204
See application file for complete search history.

(56) References Cited

U.S. PATENT DOCUMENTS

| | | | |
|---|---|---|---|
| 4,727,751 A | 3/1988 | Holmes et al. | |
| 4,841,780 A * | 6/1989 | Inada et al. | 73/861.06 |
| 5,146,414 A * | 9/1992 | McKown et al. | 702/49 |
| 5,170,670 A | 12/1992 | Fasching et al. | |
| 5,195,046 A | 3/1993 | Gerardi et al. | |
| 5,513,535 A | 5/1996 | Mayranen | |
| 5,610,703 A | 3/1997 | Raffel et al. | |
| 5,641,919 A | 6/1997 | Dahneke | |
| 5,741,980 A | 4/1998 | Hill et al. | |
| 5,812,588 A * | 9/1998 | Deak | G01K 1/12 136/230 |
| 5,829,877 A | 11/1998 | Bååth | |
| 5,986,277 A | 11/1999 | Bourque et al. | |
| 6,502,465 B1 | 1/2003 | Vedapuri et al. | |
| 6,549,274 B1 | 4/2003 | Arndt et al. | |
| 6,553,828 B1 * | 4/2003 | Thurmond | G01F 1/6888 73/204.16 |
| 6,575,043 B1 | 6/2003 | Huang et al. | |
| 6,653,651 B1 | 11/2003 | Meinhart et al. | |
| 6,675,121 B1 | 1/2004 | Hardin et al. | |
| 6,700,652 B2 | 3/2004 | Chao et al. | |

(Continued)

FOREIGN PATENT DOCUMENTS

CN    106290974 A  *  1/2017

*Primary Examiner* — Lisa M Caputo
*Assistant Examiner* — Brandi N Hopkins
(74) *Attorney, Agent, or Firm* — Burns & Levinson LLP; Orlando Lopez

(57) ABSTRACT

A measurement system includes a plurality of thermocouples, where the plurality of thermocouples is located in a support component and includes at least three groups of thermocouples. The at least three groups of thermocouples can also include one thermocouple shared by the each group of thermocouples. A distance between two thermocouples from each of the at least three groups is selected to enable measurement of temperature/flow field features of a predetermined characteristic length.

4 Claims, 10 Drawing Sheets

(56) References Cited

U.S. PATENT DOCUMENTS

| | | |
|---|---|---|
| 6,721,678 B1 | 4/2004 | Zhang et al. |
| 6,725,076 B1 | 4/2004 | Jensen |
| 7,165,464 B2 | 1/2007 | Gysling et al. |
| 7,328,624 B2 | 2/2008 | Gysling et al. |
| 7,382,900 B2 | 6/2008 | Wieneke |
| 2009/0084177 A1* | 4/2009 | Ao et al. .................... 73/170.12 |
| 2011/0098938 A1* | 4/2011 | Huang et al. .................... 702/25 |
| 2011/0170105 A1* | 7/2011 | Cui et al. ...................... 356/450 |

* cited by examiner

SYSTEM AND METHOD OF MEASURING 2- AND 3-DIMENSIONAL VELOCITY VECTOR USING CROSS-CORRELATION VELOCIMETRY

CROSS REFERENCE TO RELATED APPLICATIONS

This application claims priority to U.S. Provisional Application Ser. No. 61/299,850 filed Jan. 29, 2010, entitled VELOCITY PROBE TO MEASURE 2 AND 3-DIMENSIONAL VELOCITY VECTOR USING CROSS CORRELATION VELOCIMETRY, the contents of which are incorporated by reference herein in their entirety for all purposes.

BACKGROUND

These teachings relate generally to a system and method for measuring a 2- or 3-dimensional velocity vector in a detection system used in an emergency environment.

According to RAND Report on Emergency Responder Injuries and Fatalities, being caught or trapped, or being exposed to fire products or chemicals, is the second leading cause of injuries and fatalities within the fire service. All of these conditions can occur in a structural response when firefighters have limited information of the actual conditions inside the structure. These structures are not limited to buildings, but include other areas of interest such as tunnels and subway systems. The lack of real-time data and internal situational awareness contributes to the chaotic environment and the resulting loss of life. In addition to intentional acts of violence, this system of these teachings could have potential impacts to aid in the response to accidental fires in structures.

It is clear that current detection and preventions systems are limited in their ability to provide this critical information needed to enhance situational awareness of the responding firefighters and incident commanders who are responsible for making on-site decisions about the incident response. The majority of systems available today in the fire detection arena provide a single measure of information. This is typically in the form of a smoke or heat detection system relays only an indication that there is a problem. While these systems are a crucial component in addressing the life safety goals for the built environment, there are notorious for having faulty response rates. Most experts agree that the greatest shortcoming of fire detectors is a high rate of nuisance alarms that limit their credibility with the public.

Understanding the issues associated with existing detection systems, there is a trend toward the use of more elaborate and integrated sensing systems that would combine the fire detection and other safety and control systems together into one "intelligent" system. These types of systems are intended to increase the safety and response associated with fire related situations. Integrated building systems hold the potential for reducing false alarms, speeding building evacuation and assigning in fire fighting.

The ability of these advanced systems to provide such results are directly reliant upon the technology utilized and the design of the system. The purpose of detecting fires early is to provide an alarm when there is an environment which is deemed to be a threat to people or a building. High reliability detection is based on the supposition that it is possible to utilize a sufficient number of sensors to ascertain unequivocally that there is a growing threat either to people or to a building and provide an estimation of the seriousness of the threat. Therefore, reliability and design of the system is a critical component to ensure that system provides the correct data in enough time to allow both the people inside and the fire fighters responding to make informed decisions about their course of action. These types of systems have the ability to decrease loss of life and property.

Fire detection and suppression systems provide critical responses during a fire. In the early stages of a fire, it is critical to understand the flow behavior in order to conduct a proper fire protection assessment. The advancement in capability from the three dimensional velocity probe described herein has the potential of providing this increased level of flow behavior characterization needed for these advanced detection systems. This would allow for a more complex and accurate depiction of the actual situation within the structure allowing fire fighters and incident commanders to make more informed decisions regarding the structural integrity, smoke and toxic products faced.

One of the main requirements for such an emergency response system is reliable temperature and velocity prediction of fire induced flow fields. While thermocouples are relatively cheap and reliable, velocity measuring devices such as bidirectional probes and hot wire anemometers are almost 20 times the cost. Bidirectional probes cannot measure low velocity flows which originate from incipient or small fires, and hot wire anemometers normally cannot operate at a temperature range more than 50° C. Optical methods such as Laser Doppler anemometry and particle image velocimetry cannot be applied in large scale fire environments. The velocity measuring probe described herein allows accurate measurement of velocity at $\frac{1}{10}$th the cost of current velocity measuring techniques opening up a new market for the fire sensing technology.

Previous studies have shown that the cross correlation velocity (CCV) measuring technique can be used to measure velocity. The CCV technique described herein is based in principle on the "frozen eddy" concept in turbulent flows put forward by Professor Geoffery Ingram Taylor in 1938. Taylor hypothesized that in a turbulent flow, there are eddy structures that retain their shape and characteristics over some time and space. A thermocouple pair can identify and trace these eddy structures to obtain the mean velocity of the flow. If the thermocouples are spaced d cm apart, the mean velocity of the flow, v, is simply equal to $r/\tau$, where $\tau$ seconds is the offset (phase lag) between the two thermocouple signals. Professor Cox was the first to verify the "frozen eddy" hypothesis thereby developing the first one dimensional CCV probe in 1970. However, the high cost associated with expensive analogue correlators available in the 1970's caused the technique to gradually phase out. Hence, although conceptually sound, the idea was never implemented into a commercially available probe. The present teachings improve upon Cox's probe such that it can be mass produced and sold commercially, and then to develop a three-dimensional velocity measurement probe. The applications of a three dimensional probe are limitless and extend beyond fire applications to any environment that requires flow measurements in turbulent flows with a temperature gradient (e.g.: furnaces, coal fired power plants, aircraft engines, mining operations, ocean waves etc.). A probe design capable of measuring all the three components of a velocity vector simultaneously by correlating data from three or more thermocouples has never been designed.

The velocity probe to be described herein is inexpensive to construct (comprising of only seven thermocouples) and has the potential of yielding high accuracy with the recent advances in signal conditioning and data acquisition methods. The main advantage of the probe is its economy in construction and setting up cost. Ideally it could be placed anywhere in a fire room where thermocouples are usually installed, thereby allowing both temperature and velocity measurements simultaneously.

BRIEF SUMMARY

In one embodiment, the system of these teachings includes a measurement system comprising a plurality of thermocouples, the plurality of thermocouples being located in a support component and comprising at least three groups of thermocouples. The thermocouples from each group of the at least three groups are located such that at a distance between at least one member of one group and at least one member of another group is selected to enable measurement of temperature/flow field features of a first predetermined characteristic length. The at least three groups of thermocouples also comprise at least one thermocouple surrounded by the at least three groups of thermocouples. A third distance between the at least one thermocouple and at least one thermocouple from each of the at least three groups is also selected to enable measurement of temperature/flow field features of a second predetermined characteristic length.

In another embodiment, the method of the present teachings includes a method for determining velocity of flow comprising 1) obtaining at least one cross-correlation between measurements of temperature in a flow field; and 2) determining from said at least one cross-correlation a characteristic flow velocity.

For a better understanding of the present teachings, together with other and further needs thereof, reference is made to the accompanying drawings and detailed description and its scope will be pointed out in the appended claims.

DETAILED DESCRIPTION

Figure 1:
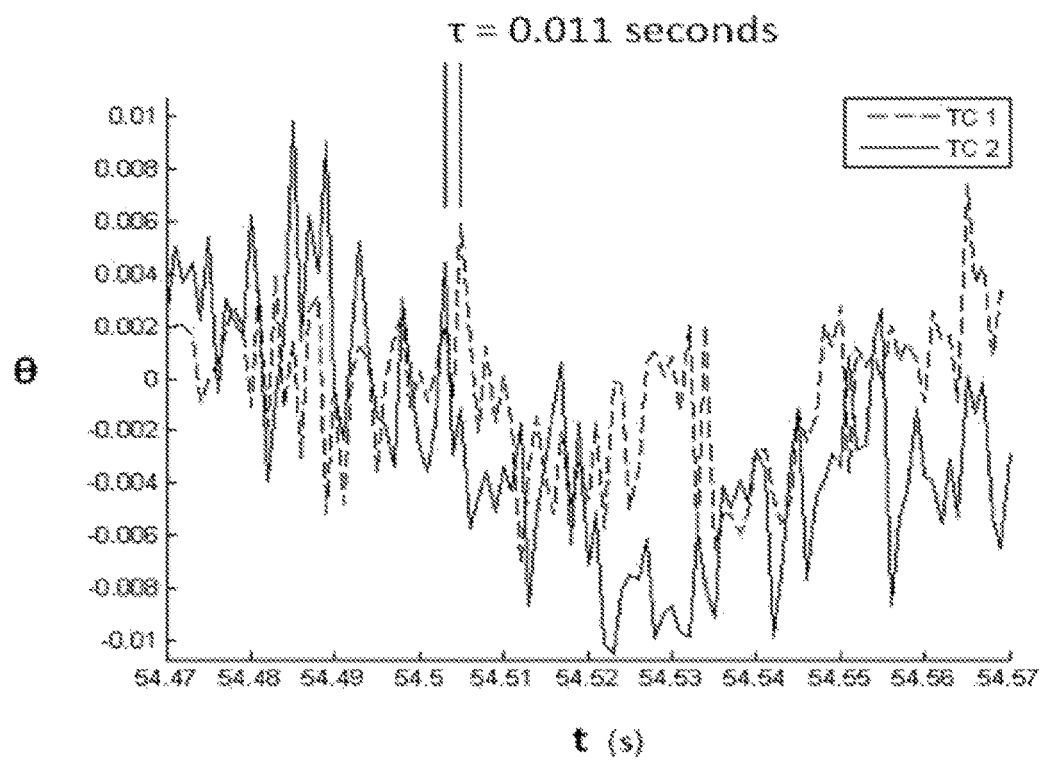
FIG. 1 is a pictorial illustration of one embodiment of the system of these teachings.
Figure 1:
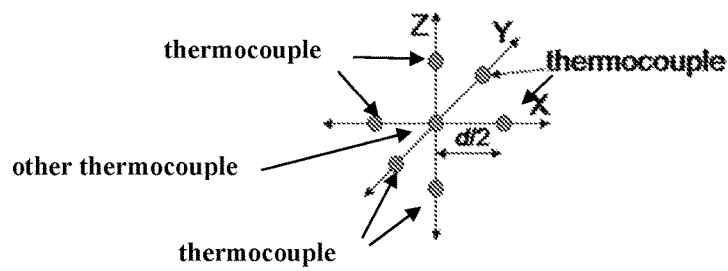
Figure 1:
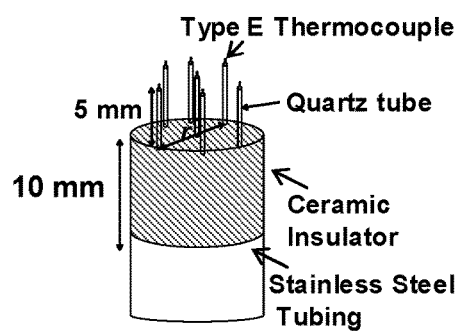
Figure 1A:
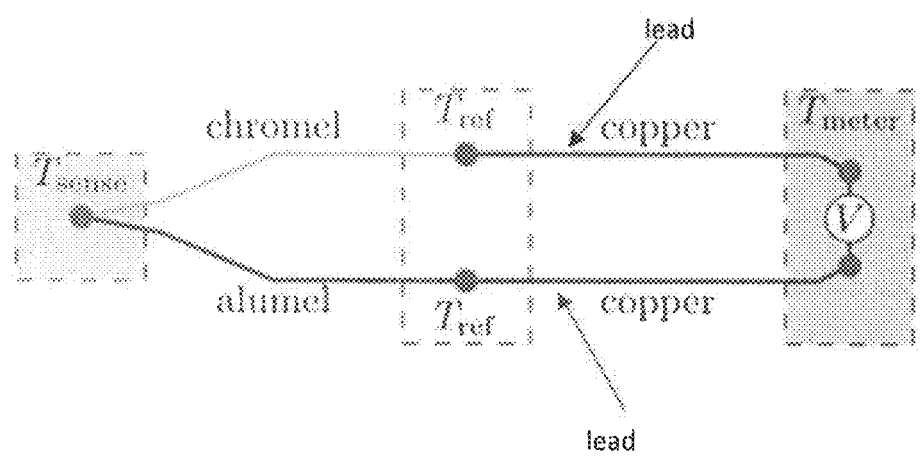
FIG. 1A is a schematic representation of a conventional thermocouple.

A probe design with seven thermocouples (FIG. 1) is described herein. (A conventional thermocouple is shown in FIG. 1A, the drawing being obtained from htts://en.wikipedia.org/wiki/Thermocouple, accessed 2018.) The fluctuations from the three thermocouple pairs along X, Y and Z are be cross-correlated to give the three components of the velocity vector The thermocouple in the center allows decreasing the separation distance to $\tau/2$. This allows three different cross correlations that can be obtained along one axis thereby increasing the velocity range of the probe. For a given velocity range, the accuracy increases with a higher sampling rate. The minimum sampling rate is equal to 500 Hz and the sampling distance varies between 0.5-2.5 cm depending on the flow velocity. Hence, there is an optimum spacing distance for a given sampling rate and velocity range. Flows with larger eddies (the term "eddy" being used herein the usual sense in fluid mechanics and constituting a collectivistic length; "flow field" as used herein is the distribution of velocity and temperature of a fluid as functions of position and time), could be measured with a larger spacing distance (two extreme probes located r cm apart), while flows with smaller eddies that tend to dissipate energy over shorter distances can be measured using the center probe cross and one of the outer probes ($\tau/2$ cm apart).

Figure 2:
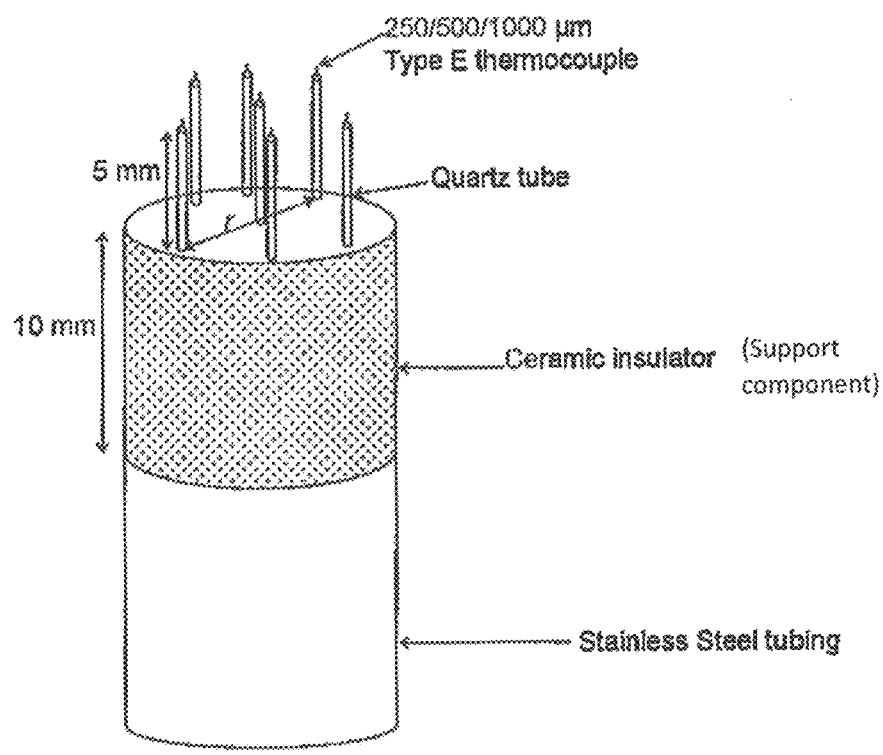
FIG. 2 is a pictorial illustration of another embodiment of the system of these teachings.

An embodiment of the velocity probe that uses seven thermocouples is shown in FIG. 2. The probe is composed of a seven-hole insulator made up of recrystallized pure alumina ceramic. Seven E-type thermocouples are threaded through the ceramic insulator with their junctions set at a fixed distance r with respect to each other. The optimum distance (r) and diameter of the thermocouple wire (d) are obtained from measurements that are used during probe construction.

Figure 3:
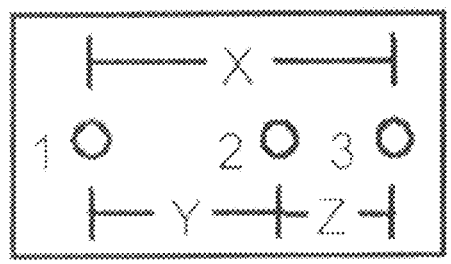
FIG. 3 is a graphical schematic representation of an embodiment of the method of these teachings.

The two and three dimensional CCV probe can be configured as either a two or a three dimensional velocity probe consisting of a number of thermocouples arranged in a known pattern which record the temperature gradients through heated turbulent eddies. The first generation pattern will consist of seven thermocouples arranged along the three Cartesian coordinate axes with separation distances determined by future optimization experiments. Each axis will have three overall separation distances using three thermocouples in a pattern as shown in FIG. 3.

I. In House One Dimensional Data

Figure 4:
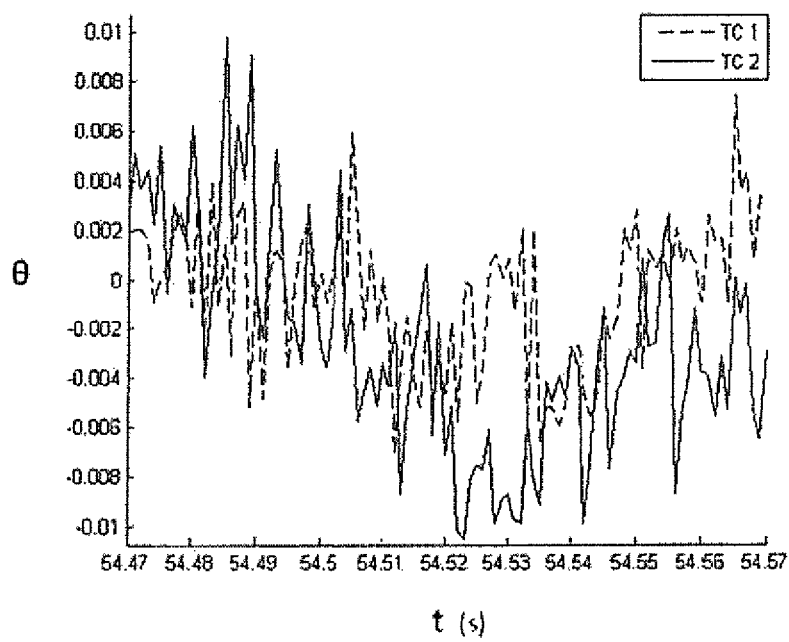
FIG. 4 is a graphical chart of a cut-out section of two non-dimensionalized temperature profiles.

FIG. 4 shows a cut out section of two non-dimensionalized temperature profiles collected simultaneously at a sampling rate at a sampling rate of 1000 Hz and a thermocouple separation distance of 15 mm. The temperature profiles were non-dimensionalized using Eq. 1 where $T_{ave}$ is the average temperature of the entire data set of a single temperature profile and $T_{max}$ is the maximum temperature found in a single temperature profile.

$$\theta = \frac{T - T_{ave}}{T_{max}} \quad (1)$$

Figure 5:
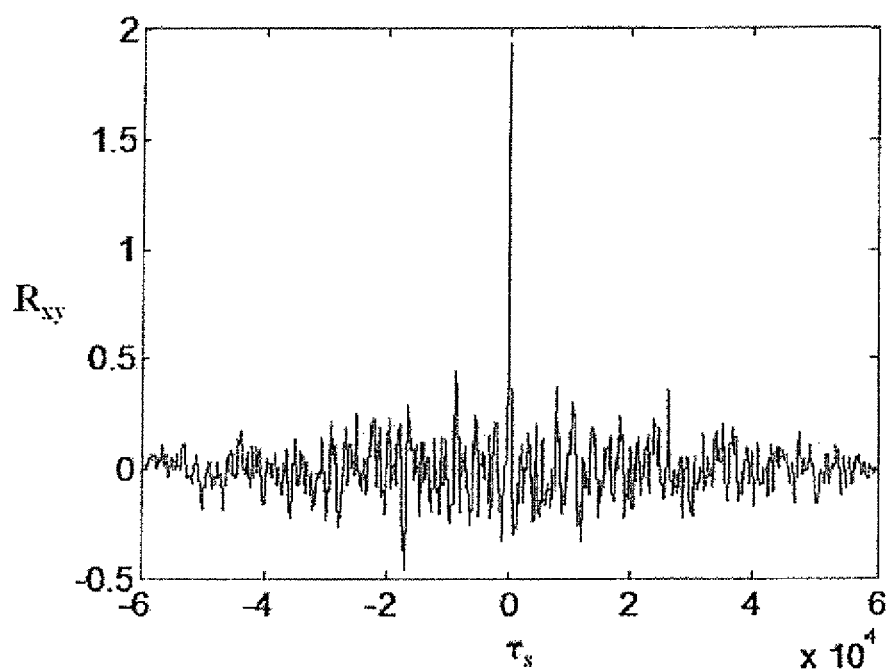
FIG. 5 is a graphical chart of the cross-correlation of the of the temperature profiles of which a section was shown in FIG. 4.

FIG. 5 shows the cross correlation of the of the temperature profiles of which a section was shown in FIG. 4. Eq. 2 shows the equation used to calculate the cross correlation coefficient $R_{xy}$. The x-axis corresponds to the sampling lag between the two signals and the y-axis corresponds to the value of the cross correlation coefficient. The cross-correlation was done using the equation shown in Eq. 2. The spike in the cross-correlation coefficient corresponds to the nominal sampling lag between the two signals.

$$R_{xy}(r, \tau) = \lim_{T \to \infty} \frac{1}{T} \int_0^T x(t - \tau) y(t) dt \quad (2)$$

Figure 6:
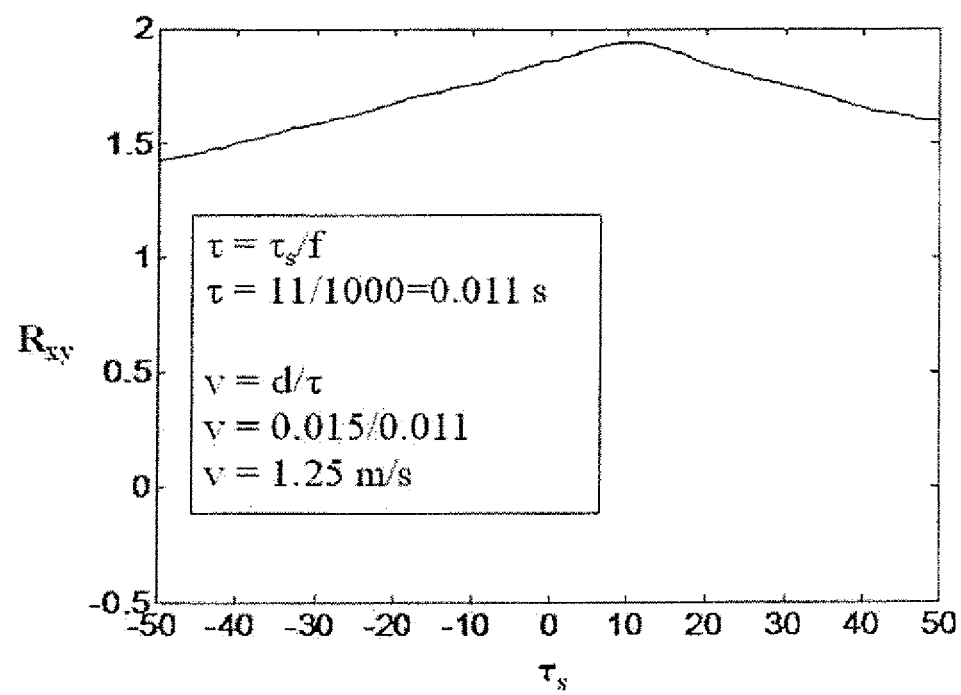
FIG. 6 is a detailed graphical chart of the spike shown in FIG. 5.
Figure 7:
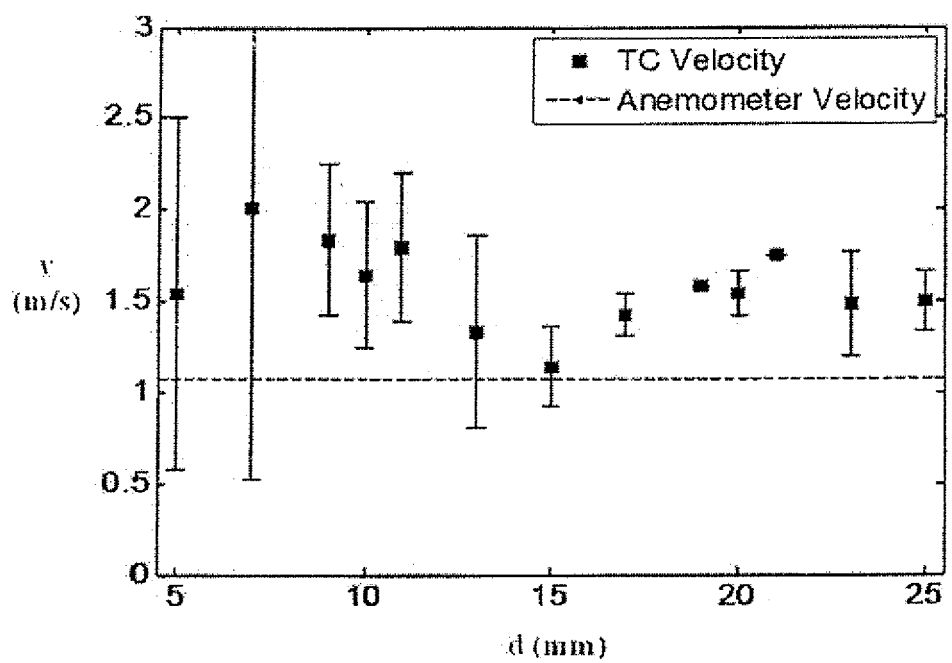
FIG. 7 is a graphical chart the velocities measured using the CCV technique of the methods of these teachings.

FIG. 6 shows a up close picture of the spike shown in FIG. 5. As can be seen the maximum lag occurs at a value of 11 samples. This corresponds to a lag time of 0.011 seconds and a velocity of 1.25 m/s as can be seen in the calculations shown in FIG. 5. FIG. 7 shows the velocities measured using the CCV technique at different separation distances with data collected at a sampling rate of 1000 Hz. As can be seen from FIG. 7 the CCV technique is optimized, at this velocity of slightly more than 1 m/s as measured by a hot wire anemometer, at a thermocouple separation distance of 15 mm. The velocities were calculated using 15 seconds of temperature data and eight data sets were used in total. The solid black points are the average of these values and the error bars show the value of the maximum deviation from the average value. This data shows that the technique does work in a one-dimensional situation.

II. Multi Dimensional Calculations

To calculate a multidimensional velocity using CCV, several assumptions must be made. First, the turbulent eddies must be much larger than the thermocouple probe and the flow is never perfectly in line with any of the probe axis. This allows the velocities calculated along each axis to be related to produce a true corrected velocity. To show how this works a set of calculations is presented below. In the real experiment the lag would be found experimentally using the CCV and used to calculate the velocity. In these calculations the lag is calculated based on the assumed flow and the procedure for calculating a matching velocity using that lag is shown.

Figure 8:
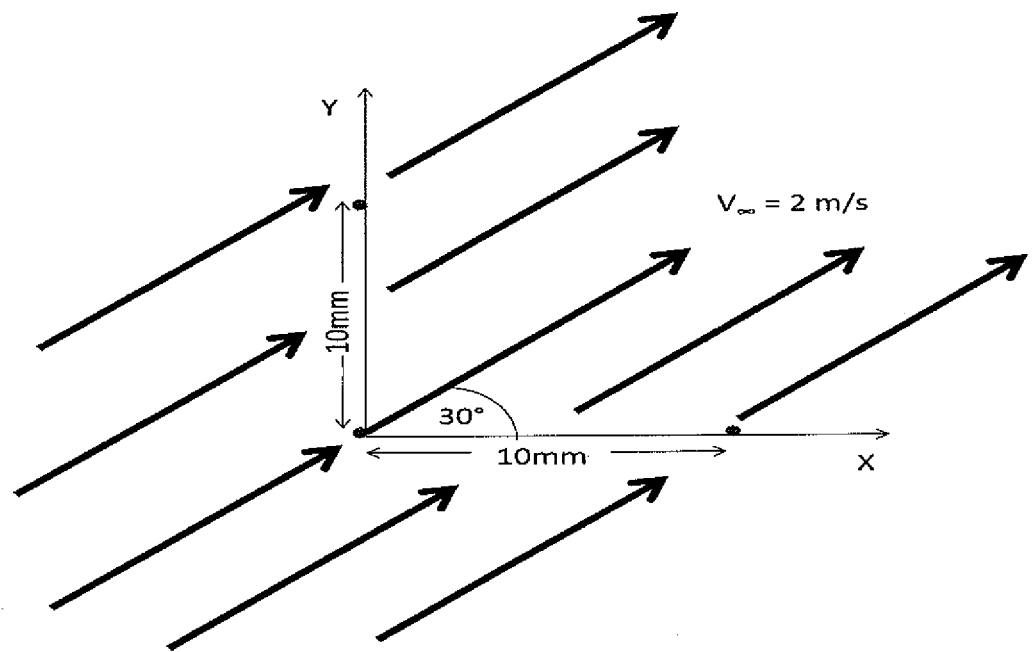
FIG. 8 is a graphical chart of calculations made by the system of these teachings.

Two Dimensional Flow Calculations:

This type of probe could be used in a ceiling jet or doorway where the flow is likely to be only in two directions. For these calculations let us assume that there is a turbulent steady flow with a velocity of 2 m/s at an angle of 30 degrees to the Cartesian coordinate system on which the 2D CCV probe is mounted as shown in FIG. 8. It is also assumed that data is being samples at 1000 Hz.

For the CCV technique to work the eddies must be much larger than the CCV probe. As long as this is the case then the two axis can be separated and looked at like they are two separate one dimensional probes. Since the movement of the air is not along the axis of the two pseudo one-dimensional probes the distance which the air moves in the pseudo axial directions, $D_x$ and $D_y$ is now a trigonomic function of the air's velocity and the separation distance of the probes.

Figure 9:
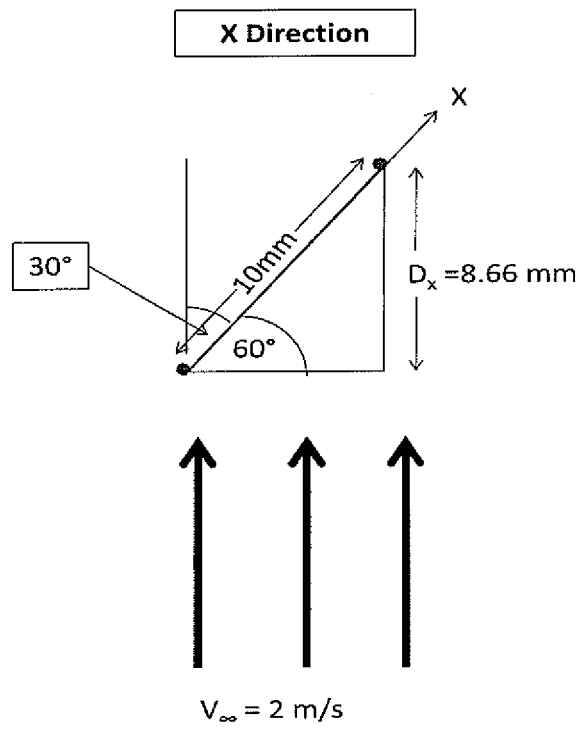
FIGS. 9-17 are a graphical schematic representations of embodiments of the method of these teachings.

To find the distance the air will travel in the x direction the coordinate system is rotated until the air is moving vertically as shown in FIG. 9. Eq. 3 shows that the pseudo separation distance between the probes is $D_x$=8.66 mm.

$$\sin\theta = \frac{D_x}{10} \quad (3)$$
$$D_x = 10 * \sin(60)$$
$$D_x = 8.66 \text{ mm}$$

This means that the number of samples recorded or the sampling lag in the pseudo x direction will be 4.33 as shown in Eq. 4 and the velocity in the pseudo x direction will be 2.309 m/s as shown in Eq. 5.

$$lag_x = \frac{\text{sampling\_rate}}{\text{Velocity}}(D) \quad (4)$$
$$lag_x = \frac{1000}{2}(0.00866)$$
$$lag_x = 4.33$$

$$v_x = \frac{\text{sampling\_rate}}{\#\_\text{samples}}D \quad (5)$$
$$v_x = \frac{1000}{4.33}(0.010)$$
$$v_x = 2.309 \text{ m/s}$$

Since the sampling lag cannot be fractions of a sample in real experimentation the rounding will add some error into this measurement technique but the decimals are left in here for the purposes of demonstration. To minimize this error, the data is collected faster so that the effect of round off is minimized.

Figure 10:
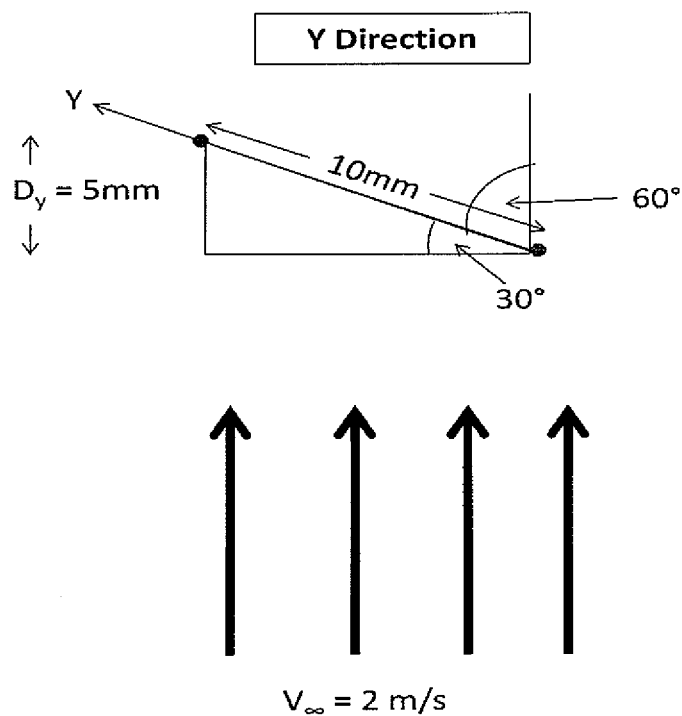

A similar procedure can be done in the y direction as shown in FIG. 10. Eq. 6 shows that the pseudo distance the air will travel is Dy=5 mm. Eqs. 7 and 8 show that the lag that will be found in the pseudo y direction is 2.5 samples and that the velocity found will be 4 m/s.

$$\sin\theta = \frac{D_y}{10} \quad (6)$$
$$D_y = 10 * \sin(30)$$
$$D_y = 5 \text{ mm}$$

$$lag_y = \frac{\text{sampling\_rate}}{\text{velocity}}D_y \quad (7)$$
$$lag_y = \frac{1000}{2}(0.005)$$
$$lag_y = 2.5$$

$$v_y = \frac{\text{sampling\_rate}}{lag_y}D \quad (8)$$
$$v_y = \frac{1000}{2}(0.010)$$
$$v_y = 4 \text{ m/s}$$

These two calculated velocities do not represent the true velocities because the flow is not along the axis of the two pseudo probes but knowing that these two velocities are related the two uncorrected velocities can be used to find the angle of the true flow, which can be used to correct the pseudo velocities to calculate the true flow velocity. As shown in Eq. 10 by taking the inverse tangent of the two calculated velocities the angle of the flow can be found w/ respect to the preferred axis or the axis which corresponds to the velocity in the numerator of the fraction being acted upon. As shown in Eq. 11 the true velocity can then be found by multiplying the preferred pseudo speed by the cosine of the angle calculated in Eq. 10. This produces the conditions proposed at the beginning of this exercise.

$$\theta_x = \tan^{-1}\left(\frac{v_x}{v_y}\right) \quad (9)$$
$$\theta_x = \tan^{-1}\left(\frac{2.309}{4}\right)$$
$$\theta_x = 29.9957$$

$$v = v_x \cos(\theta_x) \quad (10)$$
$$v = 2.309 * \cos(29.9957)$$
$$v = 1.99974 \text{ m/s} \approx 2 \text{ ms}$$

Figure 11:
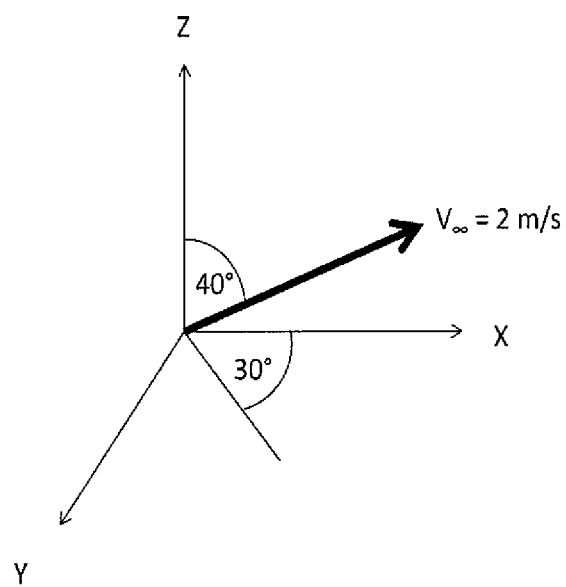

Three Dimensional Calculations:

To test the solution method for the three dimensional flow case as will be found in the majority of the portions of a room that contains a fire, let us start with the same solutions as were used in the two-dimensional case. There is a 2 m/s flow at an angle of 30 degrees with respect to the x axis in the XY plane, the flow is also at an angle of 40 degrees with respect to the Z axis as show in FIG. 11. Data is assumed to be collected at 1000 Hz and it is assumed that decimals in the lag are acceptable.

Once again assuming that the turbulent eddies are much larger than the probe the three dimensional probe can be broken up first into two two-dimensional systems and then again into four one-dimensional systems which yield pseudo velocities which can be related to yield the true velocity.

Figure 12:
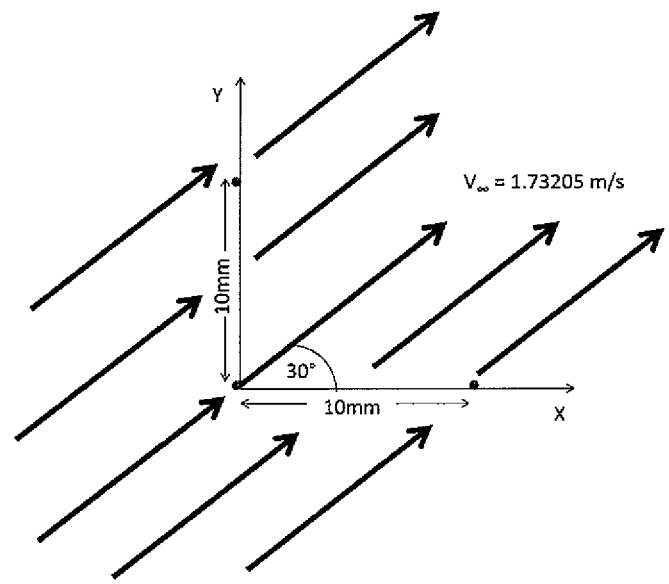
Figure 13:
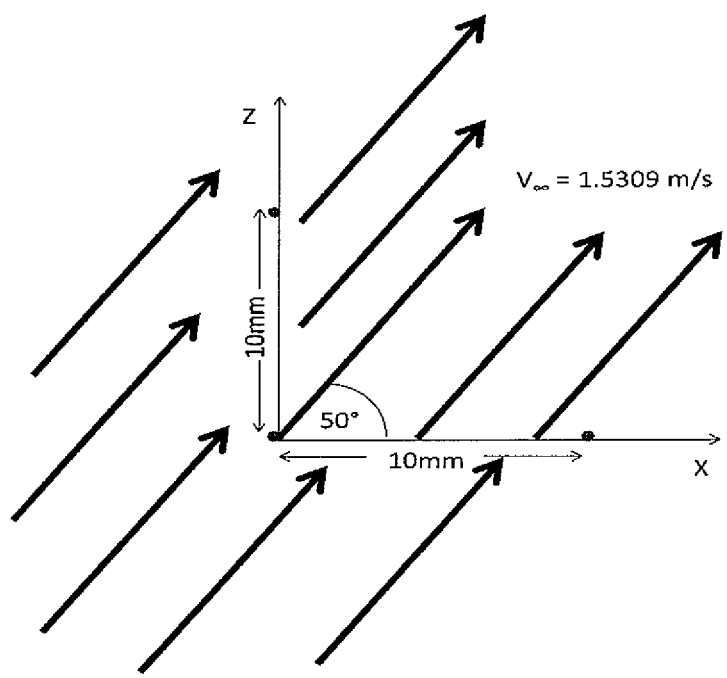

First the three dimensional domain can be broken up into the two two-dimensional systems shown in FIGS. 12 and 13. Simple Trigonometry shows that the velocities in the XY and XZ planes are 1.285 m/s and 1.552 m/s respectively as shown in Eq. 12 and 13.

$$\cos\theta = \frac{v_{xy}}{v_\infty} \quad (11)$$
$$v_{xy} = 2*\cos(30)$$
$$v_{xy} = 1.73205 \text{ m/s}$$
$$\sin\theta = \frac{v_{xz}}{v_\infty} \quad (12)$$
$$v_{xz} = 2*\cos(50)$$
$$v_{xz} = 1.53209 \text{ m/s}$$

Figure 14:
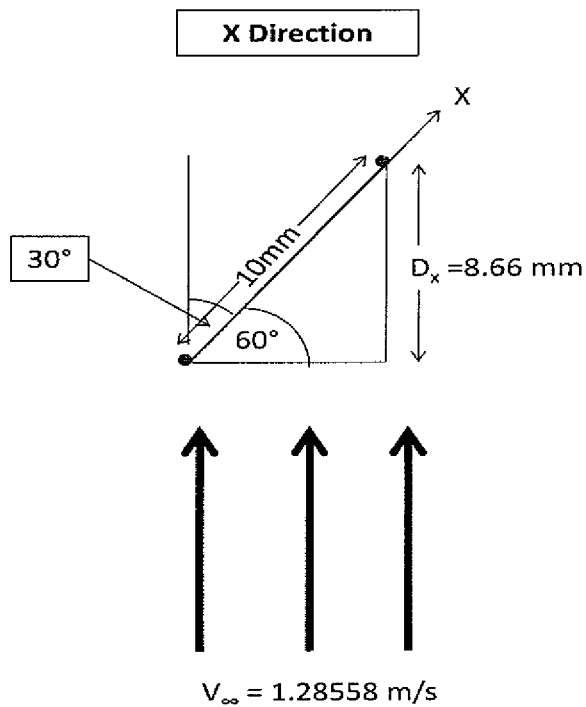
Figure 15:
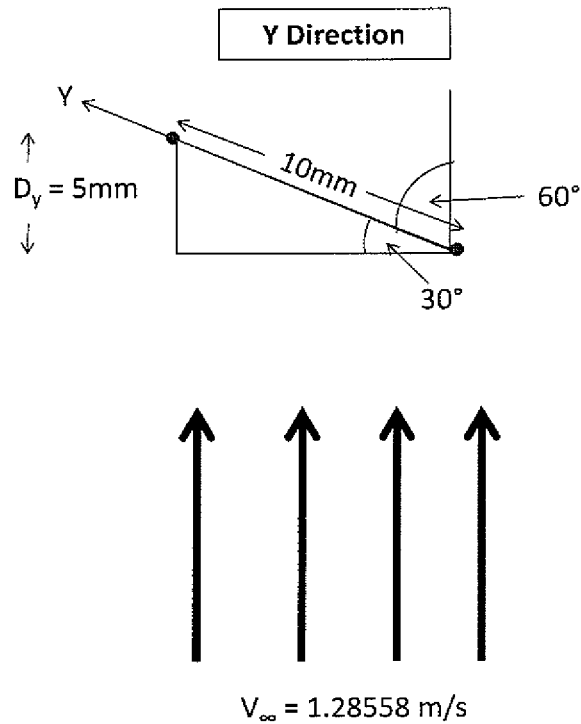

The XY plane shown in FIG. 12 can be broken down in the exact same way as the two-dimensional case shown in FIGS. 9 and 10 except the velocity is 1.73 m/s. This is shown in FIGS. 14 and 15.

The lag found in the pseudo x direction is 4.99986 and the velocity calculated is 2.014 m/s as shown in Eqs. 14 and 15.

$$lag_{x1} = \frac{\text{sampling\_rate}}{\text{velocity}} D_x \quad (13)$$
$$lag_{x1} = \frac{1000}{1.73205}(0.00866)$$
$$lag_{x1} = 4.99986$$
$$v_{x1} = \frac{\text{Sampling\_rate}}{lag_{x1}} D \quad (14)$$
$$v_{x1} = \frac{1000}{4.99986}(0.010)$$
$$v_{x1} = 2.014 \text{ m/s}$$

The lag and velocity for the pseudo y direction are 2.88675 and 3.4641 m/s respectively as shown in Eqs. 16 and 17.

$$lag_y = \frac{\text{sampling\_rate}}{\text{velocity}} D_y \quad (15)$$
$$lag_y = \frac{1000}{1.73205}(0.005)$$
$$lag_y = 2.88675$$
$$v_y = \frac{\text{Sampling\_rate}}{lag_y} D \quad (16)$$
$$v_y = \frac{1000}{2.88675}(0.010)$$
$$v_y = 3.4641 \text{ m/s}$$

Figure 16:
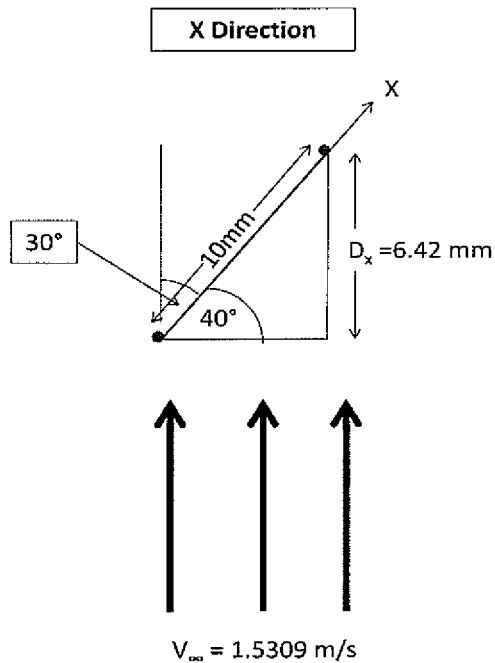
Figure 17:
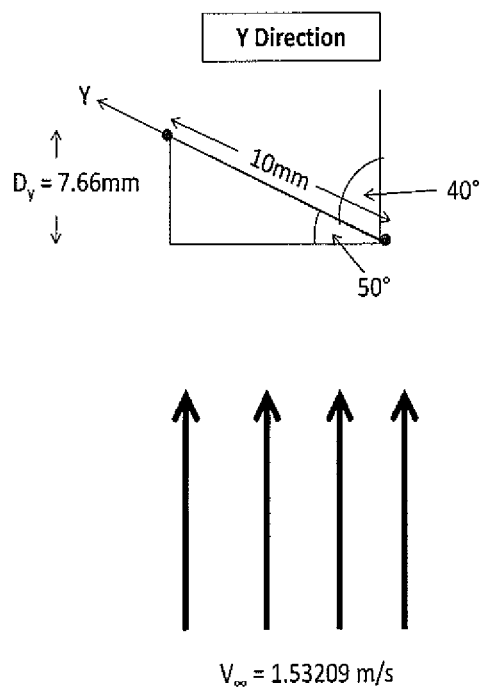

The XZ plane can be broken up into pseudo directions as shown in FIGS. 16 and 17.

The lag in the x direction of the XZ plane is defined as x2. The lag and velocity in the x2 direction are found to be 4.1955 and 2.38351 m/s respectively as shown in Eqs. 17 and 18.

$$lag_{x2} = \frac{\text{sampling\_rate}}{\text{velocity}} D_{x2} \quad (17)$$
$$lag_{x2} = \frac{1000}{1.53209}(0.00642788)$$
$$lag_{x2} = 4.1955$$
$$v_{x2} = \frac{\text{Sampling\_rate}}{lag_y} D \quad (18)$$
$$v_{x2} = \frac{1000}{4.1955}(0.010)$$
$$v_{x2} = 2.38351 \text{ m/s}$$

The lag and velocity in the pseudo z direction of the XZ plane are 4.9634 and 2.01475 m/s respectively as shown in Eqs. 19 and 20.

$$lag_z = \frac{\text{sampling\_rate}}{\text{velocity}} D_z \quad (19)$$
$$lag_z = \frac{1000}{1.53209}(0.00766044)$$
$$lag_z = 4.9634$$
$$v_z = \frac{\text{Sampling\_rate}}{lag_y} D \quad (20)$$
$$v_z = \frac{1000}{4.9634}(0.010)$$
$$v_z = 2.01475 \text{ m/s}$$

To the angles for the given flows with relation to the respective planes are shown. Eq. 21 shows the calculation of the angle of the flow w/ respect to the XY plane and Eq. 22 shows the angle with respect to the XZ plane. Calculating the corrected velocities for the XY plane and the XZ plane are shown in Eqs. 23 and 24. The total corrected velocity can be found by dividing the corrected Z velocity by the sin of $\theta_{xz}$ or by dividing the corrected XY velocity by the cos of $\theta_{xy}$. The latter is shown as Eq. 24.

$$\theta_{xy} = \tan^{-1}\left(\frac{v_{x1}}{v_y}\right) \quad (21)$$
$$\theta_{xy} = \tan^{-1}\left(\frac{2.014}{3.4641}\right)$$
$$\theta_{xy} = 30.1928$$
$$\theta_{xz} = \tan^{-1}\left(\frac{v_{x2}}{v_z}\right) \quad (22)$$
$$\theta_{xz} = \tan^{-1}\left(\frac{2.38351}{2.01475}\right)$$
$$\theta_{xz} = 49.7926$$
$$v_{xy} = v_x \cos(\theta_{xy}) \quad (23)$$
$$v_{xy} = 2.014*\cos(30.1928)$$
$$v_{xy} = 1.74078 \text{ m/s} \approx 2 \text{ ms}$$

-continued $$v_\infty = \frac{v_{xz}}{\sin(\theta_{xz})} \quad (24)$$

$$v_\infty = \frac{1.53209}{\sin(49.7926)}$$

$$v_\infty = 2.00607 \text{ m/s} \approx 2 \text{ ms}$$

Although the invention has been described with respect to various embodiments, it should be realized these teachings are also capable of a wide variety of further and other embodiments within the spirit and scope of the appended claims.

What is claimed is:

1. A measurement system comprising:
at least three groups of thermocouples, each group having a plurality of thermocouples; each one of said at least three groups of thermocouples being located along one axis from three orthogonal axes; one thermocouple from the plurality of thermocouples being from at least one group having two leads; each lead from said each one thermocouple from the plurality of thermocouples in said at least three groups being separate and different in each group;
wherein the plurality of thermocouples from each of said at least three groups of thermocouples are located at a distance between at least one first thermocouple of one group and at least one second thermocouple of said one group is selected to enable measurement of temperature/flow field features of a first predetermined characteristic length; said at least three groups of thermocouples further comprising one other thermocouple surrounded by said plurality of thermocouples from said each group and the one other thermocouple being common to each of said at least three groups of thermocouples; said at least three groups of thermocouples being located in a support component; a distance between said one other thermocouple and at least one thermocouple from each of said at least three groups being selected to enable measurement of temperature/flow field features of a second predetermined characteristic length; said second predetermined characteristic length being smaller than said first predetermined characteristic length; and
one or more correlators; said one or more correlators configured to obtain at least one cross-correlation between measurements from two thermocouples from said plurality of thermocouples, said two thermocouples being from a same group;
wherein at least one characteristic flow velocity is determined from a time value corresponding to a maximum of said at least one cross-correlation, said at least one cross-correlation obtained using the following equation:

$$R_{xy}(r, \tau) = \lim_{T \to \infty} \frac{1}{T} \int_0^T x(t - \tau) y(t) dt.$$

2. The measurement system of claim 1 wherein said support component is an insulator having a receptacle for each thermocouple.

3. The measurement system of claim 2 wherein said insulator comprises recrystallized alumina ceramic.

4. A method for determining velocity of flow in multidimensional flow, the method comprising:
at least three groups of thermocouples, each group having a plurality of thermocouples and located in a support component; each one of said at least three groups of thermocouples being located along one axis from three orthogonal axes; the plurality of thermocouples from each of said at least three groups of thermocouples are located at a distance between at least one thermocouple of one group and at least another thermocouple of said one group is selected to enable measurement of temperature/flow field features of a first predetermined characteristic length; each one thermocouple from the plurality of thermocouples being from at least one group having two leads; each lead from said each one thermocouple from the plurality of thermocouples in said at least three groups being separate and different in each group; said at least three groups of thermocouples further comprising one other thermocouple surrounded by said plurality of thermocouples from said each group and the one other thermocouple being common to each of said at least three groups of thermocouples; a distance between said one other thermocouple and at least one thermocouple from each of said at least three groups being selected to enable measurement of temperature/flow field features of a second predetermined characteristic length;
a) using the plurality of thermocouples located in one selected orthogonal axis, obtaining at least one cross-correlation between time-dependent measurements of temperature obtained from two thermocouples from a selected group from said at least three groups, said selected group being located along a selected axis from said three orthogonal axes;
b) determining a maximum value of said at least one cross-correlation, a time of said maximum value determining a sampling lag between said two thermocouples; and
c) obtaining, from said sampling lag and a distance between said two thermocouples a velocity along said selected axis;
repeating steps (a) through (c) for another selected group, said another selected group located along another selected axis in order to obtain another flow velocity along said another selected axis; and
obtaining, from said flow velocity and said another flow velocity, a characteristic flow velocity for a two-dimensional flow.

* * * * *